US011295269B2

(12) United States Patent
Vadayadiyil Raveendran et al.

(10) Patent No.: US 11,295,269 B2
(45) Date of Patent: Apr. 5, 2022

(54) COGNITIVE RETAIL FACING

(71) Applicant: Kyndryl, Inc., New York, NY (US)

(72) Inventors: Pramod Vadayadiyil Raveendran, Bengaluru (IN); Sarbajit K. Rakshit, Kolkata (IN); Kuntal Dey, Vasant Kunj (IN)

(73) Assignee: Kyndryl, Inc., New York, NY (US)

( * ) Notice: Subject to any disclaimer, the term of this patent is extended or adjusted under 35 U.S.C. 154(b) by 269 days.

(21) Appl. No.: 16/413,707

(22) Filed: May 16, 2019

(65) Prior Publication Data

US 2020/0364639 A1 Nov. 19, 2020

(51) Int. Cl.
*G06Q 10/08* (2012.01)
*B25J 9/16* (2006.01)
*G06N 20/00* (2019.01)
*G06T 7/00* (2017.01)
(Continued)

(52) U.S. Cl.
CPC .......... *G06Q 10/087* (2013.01); *B25J 9/1661* (2013.01); *B25J 9/1697* (2013.01); *G06N 20/00* (2019.01); *G06T 7/00* (2013.01); *G06T 7/74* (2017.01); *B25J 11/008* (2013.01); *G05D 2201/0207* (2013.01)

(58) Field of Classification Search
CPC .... G06Q 10/087; G06Q 10/08; G06Q 10/063; G06Q 30/0201; G06Q 30/0268; G06Q 10/00; G06T 7/74; G06T 7/00; G06N 20/00; B25J 9/1697; B25J 9/1661; B25J 11/008; G05D 2201/0207
See application file for complete search history.

(56) References Cited

U.S. PATENT DOCUMENTS 6,824,009 B2 11/2004 Hardy
7,693,757 B2 4/2010 Zimmerman
10,007,964 B1 * 6/2018 Calhoon .............. G06K 9/4604
(Continued)

FOREIGN PATENT DOCUMENTS

JP 2005313303 A * 11/2005
WO 2017201483 A1 11/2017
WO 2018039076 A1 3/2018

OTHER PUBLICATIONS

Suttle, Rick, "What Does Facing Mean in Merchandising?", printed on Apr. 2, 2019, 2 pages, <https://smallbusiness.chron.com/facing-mean-merchandising-23915.html>.
(Continued)

*Primary Examiner* — Abby Y Lin
*Assistant Examiner* — Renee LaRose
(74) *Attorney, Agent, or Firm* — Erik Swanson; George S. Blasiak; Heslin Rothenberg Farley & Mesiti PC

(57) ABSTRACT

In an approach to cognitive retail facing, one or more computer processors receive data associated with a shelf facing of one or more products on display. Based, at least in part, on the received shelf facing data, the one or more computer processors determine whether the shelf facing matches a predetermined pattern. In response to determining the shelf facing does not match a predetermined pattern, the one or more computer processors generate one or more instructions to adjust the one or more products to match the predetermined pattern. The one or more computer processors transmit the generated one or more instructions to one or more autonomous robots.

17 Claims, 3 Drawing Sheets

(51) Int. Cl.
*G06T 7/73* (2017.01)
*B25J 11/00* (2006.01)

(56) References Cited

U.S. PATENT DOCUMENTS

| | | |
|---|---|---|
| 2003/0069782 A1 | 4/2003 | Chrisman |
| 2007/0027745 A1 | 2/2007 | Ouimet |
| 2018/0096373 A1 | 4/2018 | Poole |
| 2018/0108134 A1 | 4/2018 | Venable |
| 2018/0285902 A1* | 10/2018 | Nazarian .............. G06Q 10/087 |

OTHER PUBLICATIONS

Waters, Shari, "What Does Facing Mean in Retail?", Updated Jul. 14, 2018, 1 page, <https://www.thebalancesmb.com/what-is-meant-by-facing-in-retail-stores-2890188>.
Wikipedia, "Facing (retail)", last edited on Nov. 25, 2018, 1 page, <https://en.wikipedia.org/wiki/Facing..(retail)>.

* cited by examiner

COGNITIVE RETAIL FACING

BACKGROUND OF THE INVENTION

The present invention relates generally to the field of analytics, and more particularly to cognitive retail facing.

Retailers, wholesalers, and showrooms place their products on shelves in certain ways. They may arrange product packages in colorful patterns, for example, horizontal, vertical, or in a particular shape, such as a diamond or a star, etc., and they may feature some brands more than others. "Facing" typically refers to moving goods to the edge of shelves with their fronts facing outward, enabling consumers to easily identify each brand when making selections. Facing is also done to keep a store appearing neat and organized. Facings can apply to many different products. Facings can be determined by the amount of sales per brand. For example, brands that sell the most may be given the highest number of facings. The amount of shelf space assigned to a particular vendor in retail or wholesale stores is highly competitive. Stores want to maximize their sales and profits by providing the top-selling brands with more space. Similarly, store managers want to keep customers happy by not running out of specific brands and can better prevent out-of-stock situations by putting more boxes or cans on the shelves. One way to accomplish this is by increasing the amount of facings for the higher-selling brands.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction.

SUMMARY

Embodiments of the present invention disclose a method, a computer program product, and a system for cognitive retail facing. The method may include one or more computer processors receiving data associated with a shelf facing of one or more products on display. Based, at least in part, on the received shelf facing data, the one or more computer processors determine whether the shelf facing matches a predetermined pattern. In response to determining the shelf facing does not match a predetermined pattern, the one or more computer processors generate one or more instructions to adjust the one or more products to match the predetermined pattern. The one or more computer processors transmit the generated one or more instructions to one or more autonomous robots.

DETAILED DESCRIPTION

Retailers know that a neat store with properly faced products can attract and positively influence customers in terms of sales and customer loyalty. Customers may be negatively affected if the customers have to spend a lot of time looking for certain products because shelves are empty or disorganized. Also, sales and customer movement throughout a store can be impacted if customers have to waste time looking for products. Typically, store employees are assigned the task of facing shelves and arranging product displays. This type of work is repetitive and time consuming. Embodiments of the present invention recognize that efficiency may be gained by off-loading the task of facing to one or more autonomous robots, enabling store employees to spend more time on customer service tasks. Embodiments of the present invention also recognize that improvement may be made to facing strategies by employing a cognitive system which can calculate the effectiveness of various facing strategies by learning which patterns, colors, products, etc., affect sales. Implementation of embodiments of the invention may take a variety of forms, and exemplary implementation details are discussed subsequently with reference to the Figures.

Figure 1:
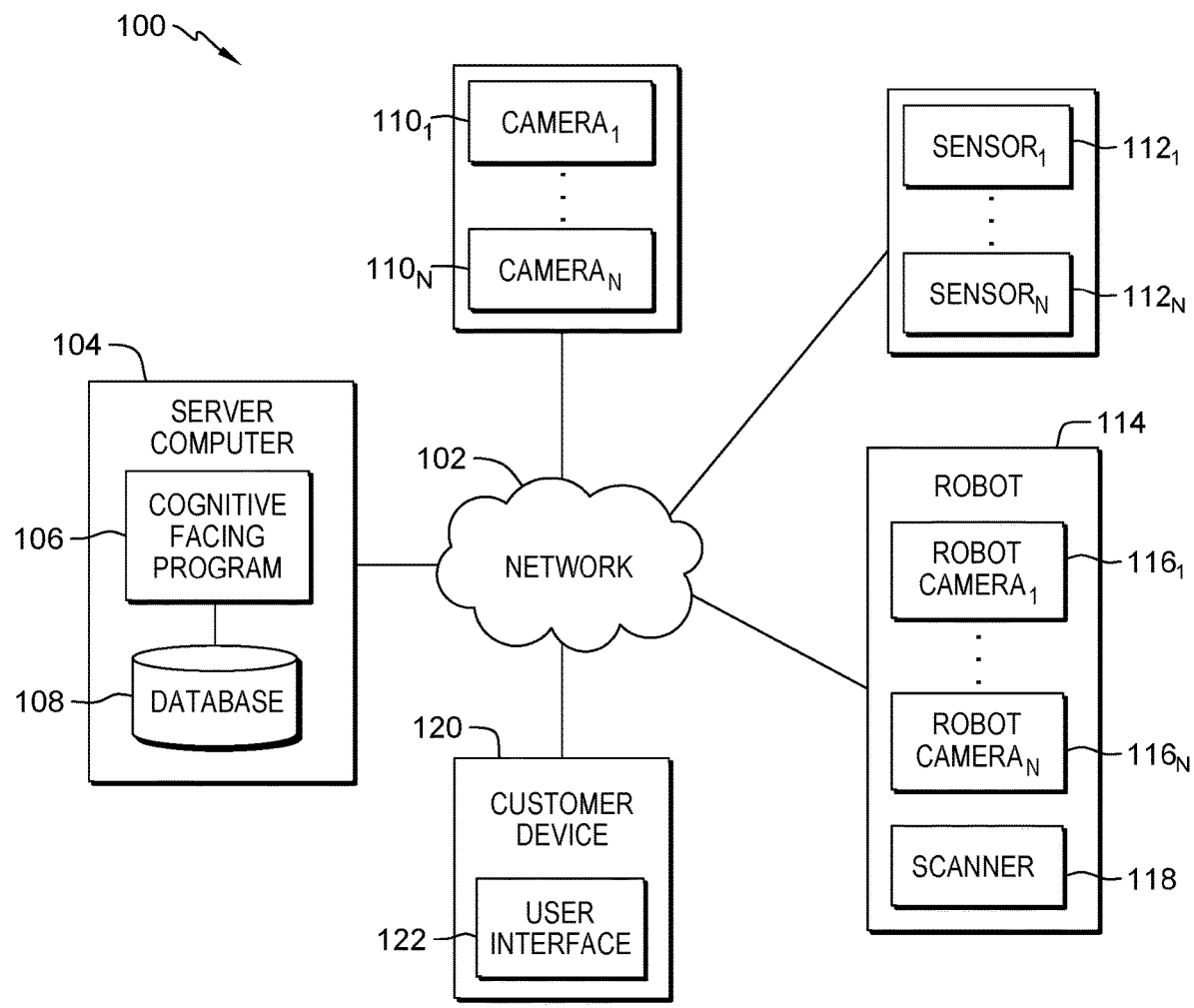
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, camera(s) 110, sensor(s) 112, robot 114, and customer device 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between camera(s) 110, sensor(s) 112, robot 114, customer device 120 and server computer 104, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with camera(s) 110, sensor(s) 112, robot 114, customer device 120 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes cognitive facing program 106 and database 108. Server computer 104 may include internal and external hardware components, as depicted and described in further detail with respect to FIG. 3.

Cognitive facing program 106 improves the process of facing in a retail, wholesale, or showroom environment by calculating the effectiveness of facing patterns and strategies and implementing the most effective facing using robots. Cognitive facing program 106 receives data associated with a shelf facing of products on display from cameras and sensors associated with various shelves or display areas in a store. By processing the images and sensor data, cognitive facing program 106 determines whether current facing matches a predetermined pattern. If the current facing does not match a predetermined pattern, then cognitive facing program 106 employs a robot, generating and transmitting instructions to the robot to improve the facing. If needed, cognitive facing program 106 can employ one or more additional robots to the task. Once the facing is updated, cognitive facing program 106 may receive feedback from the robot and from customers. Based on the feedback and additional data, cognitive facing program 106 determines an effectiveness score associated with the facing. If the effectiveness score is not above a threshold, then cognitive facing program 106 generates a new facing pattern and begins the process again. In one embodiment, cognitive facing program 106 includes an image analysis program (not shown), as known in the art. In another embodiment, an image analysis program is a standalone program that resides on server computer 104 which cognitive facing program 106 can access. In the depicted embodiment, cognitive facing program 106 resides on server computer 104. In another embodiment, cognitive facing program 106 resides on robot 114. In yet another embodiment, cognitive facing program 106 resides elsewhere within distributed data processing environment 100 provided that cognitive facing program 106 has access to database 108 and the other components depicted in FIG. 1. Cognitive facing program 106 is depicted and described in further detail with respect to FIG. 2.

Database 108 is a repository for data used by cognitive facing program 106. In the depicted embodiment, database 108 resides on server computer 104. In another embodiment, database 108 may reside on robot 114 or elsewhere within distributed data processing environment 100 provided cognitive facing program 106 has access to database 108. A database is an organized collection of data. Database 108 can be implemented with any type of storage device capable of storing data and configuration files that can be accessed and utilized by cognitive facing program 106, such as a database server, a hard disk drive, or a flash memory. Database 108 stores data used by cognitive facing program 106, such as sales of products over time, inventory records, and feedback from robots and customers. Database 108 may also store facing patterns and display designs, as well as associated effectiveness scores and thresholds. Database 108 may also store robot capabilities and health status. In addition, database 108 may store images and sensor data collected from camera(s) 110, sensor(s) 112, robot camera(s) 116, and scanner 118.

Camera $110_{1-N}$, herein camera(s) 110, and robot camera $116_{1-N}$, herein robot camera(s) 116, are each one or more of a plurality of cameras within distributed data processing environment 100 which capture images to provide views of facings in a retail environment for robot 114, respectively. Camera(s) 110 and robot camera(s) 116 may be various types of cameras, including, but not limited to, pin-hole, stereo, omni-directional, non-central, infrared, video, digital, three dimensional, panoramic, filter-based, wide-field, narrow-field, telescopic, microscopic, etc. In some embodiments, camera(s) 110 and robot camera(s) 116 include any device capable of imaging a portion of the electromagnetic spectrum. In one embodiment, camera(s) 110 and robot camera(s) 116 each include a cognitive component (not shown) that enables the cameras to learn commands and to switch functionality. For example, if the command is "Look up," then a cognitive camera can learn that the command means to rotate a motor associated with the camera to a particular angle. Camera(s) 110 reside in various locations in the retail environment and represent connected devices. Cognitive facing program 106 can use camera(s) 110 to determine whether store shelves have proper facing, i.e., products on the shelf are in alignment at the front edge of the shelf and facing forward. A variety of different cameras can have different functions. For example, camera $110_1$ may capture still images, camera $110_2$ may capture video images, and camera $110_N$ may be an infrared camera for capturing images at night. As used herein, N represents a positive integer, and accordingly the number of scenarios implemented in a given embodiment of the present invention is not limited to those depicted in FIG. 1. In one embodiment, robot camera(s) 116 within robot 114 serve as a compound eye for robot 114.

Sensor $112_{1-N}$, herein sensor(s) 112 are for detecting activity with respect to cognitive facing program 106. A sensor is a device which detects or measures a physical property and then records or otherwise responds to that property, such as vibration, chemicals, radio frequencies, environment, weather, humidity, light, etc. Sensor(s) 112 may detect weight changes on a shelf, and thereby, cognitive facing program 106 can use sensor(s) 112 to determine if products missing from a facing on the shelf are available toward the back of the shelf. Cognitive facing program 106 may also use sensor(s) 112 to detect consumer traffic patterns in a store aisle. In an embodiment, sensor(s) 112 may be included in product packaging, enabling cognitive facing program 106 to detect product identity, distance between products, location of products, etc.

Robot 114 is a machine capable of automatically carrying out a complex series of actions. In one embodiment, robot 114 carries out action in response to computing instructions, also known as commands. In one embodiment, robot 114 is a general-purpose autonomous robot. In various embodiments, robot 114 is a cognitive robot, i.e., robot 114 includes a machine learning component (not shown) which enables robot 114 to "remember" task outcomes and use that data to influence future task performance. In the depicted embodiment, robot 114 is guided by instructions from cognitive facing program 106. In another embodiment, robot 114 may be guided by an internal control device. In one embodiment, robot 114 may be constructed to take on human form. In an embodiment, robot 114 may include an aerial device capable of powered flight or gliding. Robot 114 includes robot camera(s) 116 and scanner 118. Robot 114 may also include a plurality of sensors, microphones, speakers, a global positioning system (GPS), etc. (not shown) that can receive and react to commands and sensory stimuli. In an embodiment, robot 114 represents a plurality of robots in distributed data processing environment 100.

Scanner 118 is an electronic device that can read printed barcodes, QR codes, natural language, etc., for extracting a product identifier. Scanner 118 consists of a light source, a lens and a light sensor translating for optical impulses into electrical signals. Additionally, scanner 118 may contain decoder circuitry (not shown) to analyze image data of a product identifier, provided by the light sensor and send the content to an output port of scanner 118. Robot 114 uses scanner 118 to scan products for data to be used by cognitive facing program 106, such as inventory and location.

Customer device 120 can be a laptop computer, a tablet computer, a smart phone, or any programmable electronic device capable of communicating with various components and devices within distributed data processing environment 100, via network 102. Customer device 120 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, customer device 120 represents one or more programmable electronic devices or combination of programmable electronic devices capable of executing machine readable program instructions and communicating with other computing devices (not shown) within distributed data processing environment 100 via a network, such as network 102. Customer device 120 includes user interface 122.

User interface 122 provides an interface between a user of customer device 120 and server computer 104. In one embodiment, user interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 122 may also be mobile application software that provides an interface between a user of customer device 120 and server computer 104. Mobile application software, or an "app," is a computer program designed to run on smart phones, tablet computers and other mobile devices. User interface 122 enables a user of client computing device to provide feedback to cognitive facing program 106.

Figure 2:
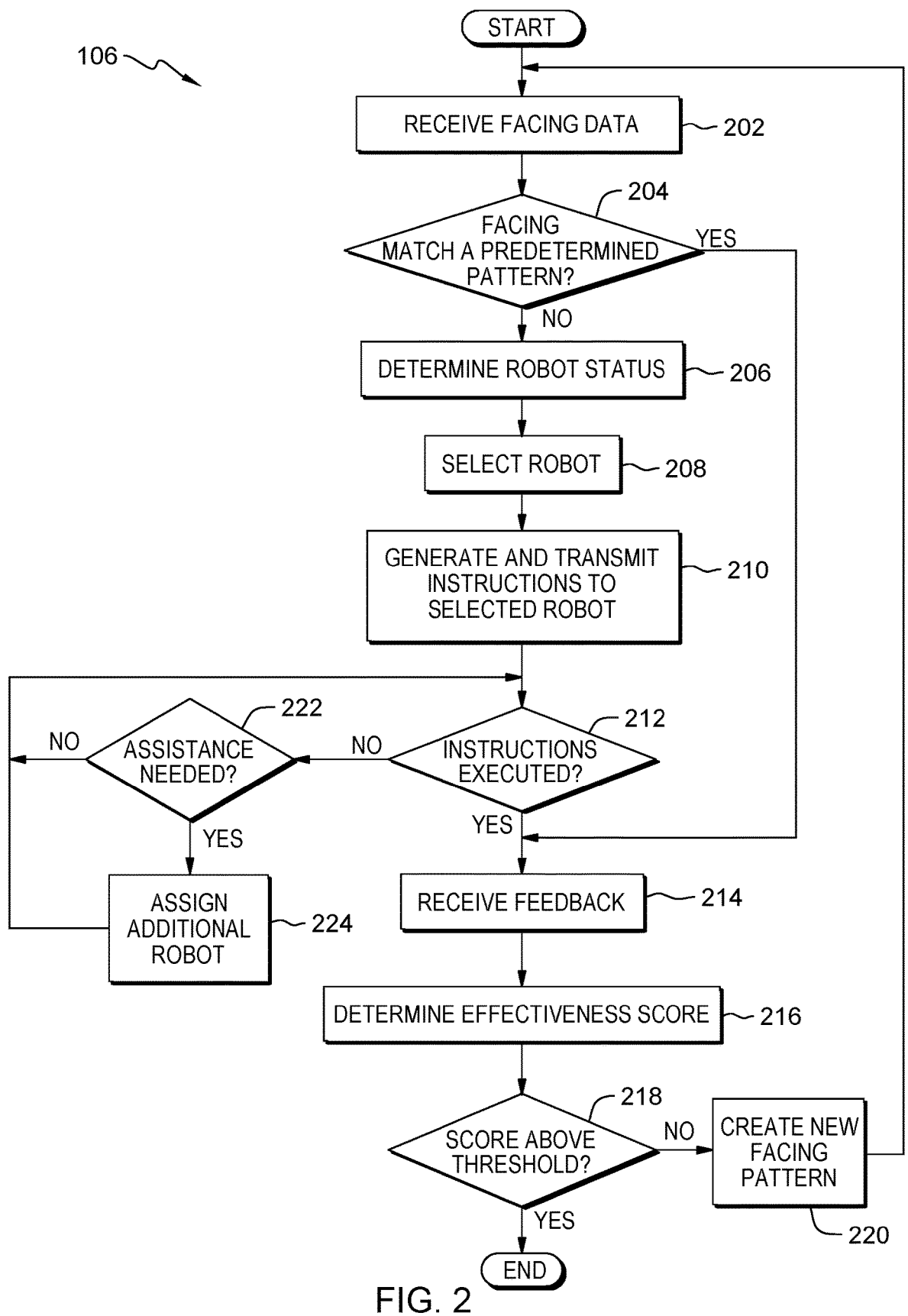
FIG. 2 is a flowchart depicting operational steps of a cognitive facing program, on a server computer within the distributed data processing environment of FIG. 1, for providing product facing plans based on machine learning, in accordance with an embodiment of the present invention.

FIG. 2 is a flowchart depicting operational steps of cognitive facing program 106, on server computer 104 within distributed data processing environment 100 of FIG. 1, for providing product facing plans based on machine learning, in accordance with an embodiment of the present invention.

Cognitive facing program 106 receives facing data (step 202). As depicted in FIG. 1, camera(s) 110 and sensor(s) 112 are installed in various locations around a store such that camera(s) 110 and sensor(s) 112 can collect images and data associated with product facing and displays around the store. In one embodiment, cognitive facing program 106 receives only images. In another embodiment, cognitive facing program 106 receives only sensor data. In a further embodiment, cognitive facing program 106 receives a combination of images and sensor data. In one embodiment, cognitive facing program 106 receives images and sensor data directly from camera(s) 110 and sensor(s) 112. In another embodiment, cognitive facing program 106 receives images from robot camera(s) 116. In a further embodiment, cognitive facing program 106 retrieves images and sensor data stored in database 108.

Cognitive facing program 106 determines whether facing matches a predetermined pattern (decision block 204). Cognitive facing program 106 analyzes the received images and sensor data to determine whether product facing on one or more shelves, or in a display area, matches a predetermined pattern. A predetermined pattern may include, but is not limited to, a shape pattern, a color pattern, an arrangement of product at the front edge of the shelf, an arrangement of a complete row on the shelf, i.e., no missing product, or any combination of patterns. In one embodiment, the predetermined patterns are created by a marketing professional associated with the store. In another embodiment, the predetermined patterns are created by cognitive facing program 106. In either embodiment, the predetermined patterns may be created based on data, such as sales data or customer feedback, as will be discussed with respect to step 214. In yet another embodiment, a marketing professional associated with the store or cognitive facing program 106 may create a random facing pattern. In one embodiment, cognitive facing program 106 compares the received images and sensor data to a pre-defined plan for a facing pattern for a particular product. For example, cognitive facing program 106 determines whether products are properly arranged, such as having the right color pattern or having the name of the product facing the front of the shelf. In an embodiment, cognitive facing program 106 may also determine if the facing is efficient, i.e., products are easy for customers to find.

If cognitive facing program 106 determines facing does not match a predetermined pattern ("no" branch, decision block 204), then cognitive facing program 106 determines a robot status (step 206). Cognitive facing program 106 employs one or more robots to manage product facing. If cognitive facing program 106 determines facing does not match a predetermined pattern, then cognitive facing program 106 determines the status of the one or more robots in an effort to determine which robot to select to update the facing. Robot status may include, but is not limited to, proximity to the shelf in need of facing, whether the robot is currently performing another task, whether the robot is operational, e.g., battery fully charged, if the robot is capable of performing the intended task, etc. In one embodiment, if cognitive facing program 106 determines facing does not match a predetermined pattern because one or more products are missing from the front edge of the shelf, then cognitive facing program 106 determines whether additional product is in inventory. If cognitive facing program 106 determines additional product is not in inventory, then cognitive facing program 106 may create a new facing pattern that utilizes the available products. In another embodiment, if cognitive facing program 106 determines additional product is not in inventory, then cognitive facing program 106 may pause or end until such time that inventory is replenished.

Cognitive facing program 106 selects a robot (step 208). Based on the determined robot status, cognitive facing program 106 selects a robot, for example, robot 114, to perform the facing task.

Cognitive facing program 106 generates and transmits instructions to the selected robot (step 210). Cognitive facing program 106 generates and transmits instructions to robot 114, based on the comparison of the current facing to the predetermined facing pattern. The generated instructions may include, but are not limited to, information for adjustment of the product such as the location of the shelf, the name of the product, a pattern for facing the product, whether products on the back of the shelf should be pulled forward to the front of the shelf, orientation of the product on the shelf (for example, with the name facing forward), timing for when the task should be performed, etc. For example, cognitive facing program 106 may determine, based on the previous comparison, that one of two products that should be identical appears smaller than the other product, indicating the "smaller" product is further away. Then cognitive facing program 106 generates instructions to move the "smaller" product so that the "smaller" product is flush with the edge of the shelf. In another example, cognitive facing program 106 may determine that the name of a product is not visible. Then cognitive facing program 106 generates instructions to adjust the product until the side of the product that includes the name of the product is perpendicular to the edge of the shelf.

Cognitive facing program 106 determines whether the instructions are executed (decision block 212). After a pre-defined period of time has elapsed since transmitting the instructions to robot 114, cognitive facing program 106 determines whether the deficient facing has been updated. In an embodiment, cognitive facing program 106 receives additional images and sensor data from camera(s) 110 and sensor(s) 112 to compare to the transmitted instructions or to a previous facing plan and determines whether the product arrangement in the new images and sensor data matches the product arrangement in the transmitted instructions or the previous facing plan. In another embodiment, cognitive facing program 106 determines whether the product arrangement in the new images and sensor data has changed from when cognitive facing program 106 determined the facing did not match the predetermined pattern. In another embodiment, robot 114 collects images of the new facing with robot camera(s) 116 and transmits the images either directly to cognitive facing program 106 or to database 108, from which cognitive facing program 106 can retrieve the images and sensor data.

If cognitive facing program 106 determines the instructions are executed ("yes" branch, decision block 212), or if cognitive facing program 106 determines the facing does match the predetermined pattern ("yes" branch, decision block 204), then cognitive facing program 106 receives feedback (step 214). In one embodiment, cognitive facing program 106 receives feedback from customers. In the embodiment, customers send feedback to cognitive facing program 106 via user interface 122 on customer device 120. For example, cognitive facing program 106 may send a survey to a customer, via user interface 122, asking for general feedback or specific feedback on a shelf or display from which the customer bought a product. In the example, customers may rate the facing on a scale of 1 to 10. In another example, a customer may provide unsolicited feedback via user interface 122. In yet another example, if customer device 120 is a wearable device in the format of glasses, a customer can provide feedback by head movements, such as nodding or shaking the head in response to questions. In another embodiment, cognitive facing program 106 may receive feedback from robot 114. The feedback may be images taken by robot camera(s) 116. For example, robot 114 may transmit images of store features, store landscape, crowd movement, customer response to specific products and patterns, etc. In another example, robot 114 may transmit product inventory status retrieved by scanner 118. In an embodiment where robot 114 includes a microphone (not shown), robot 114 may record conversations with customers and provide the recordings to cognitive facing program 106 as feedback. In a further embodiment, cognitive facing program 106 may receive feedback in the form of sales data. For example, cognitive facing program 106 may track sales of products from particular shelves or displays, which may indicate the success or failure of the employed facing strategy. In yet another embodiment, cognitive facing program 106 may receive feedback in the form of images from camera(s) 110. In a further example, cognitive facing program 106 may receive feedback in the form of sensor data from sensor(s) 112.

In one embodiment, cognitive facing program 106 uses cognitive artificial intelligence (AI) to perform machine learning for analysis of the available data to detect facing patterns, color combinations, shape formats, etc., which increase sales. Machine learning explores the study and construction of algorithms that can learn from and make predictions on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data. The cognitive AI system continuously learns about the store as it builds a custom knowledge base for the store, adding information to database 108 as the information is available and analyzed. As the knowledge base grows, the ability of cognitive facing program 106 to accurately determine the effectiveness of a facing strategy increases. In one embodiment, the cognitive AI system employs one or more neural networks to accomplish machine learning.

Cognitive facing program 106 determines an effectiveness score (step 216). Cognitive facing program 106 calculates the effectiveness of facing based on the received feedback as well as a detected pattern of sales of products in a particular facing pattern, color combination, specific shape format, etc. In an embodiment where customer rate the facing on a scale from 1 to 10, cognitive facing program can include an average customer rating as a component of the effectiveness score. In one embodiment, cognitive facing program 106 calculates sales over a period of time and attributes a score to the calculation. The effectiveness score may be a relative comparison of sales of a product from one time period to another time period, where the time periods may be associated with a particular facing pattern. In another embodiment, cognitive facing program 106 may also consider product visibility, for example, whether a product can be seen behind another product from the customer viewpoint, both front and sideways, where higher points indicate better visibility. Other examples of considerations for effectiveness score include, but are not limited to, a minimum threshold of products displayed and sold, space utilization, readability of product labels, the way items are organized on a shelf, whether a customer picks up an item from a shelf, time spent by each customer at a shelf, a facial expression of a customer at a shelf, etc.

In one embodiment, cognitive facing program 106 can provide a virtual gamification system to customer device 120, via user interface 122. Via the virtual gamification system, a customer can participate, individually or in a group, and provide facing patterns specific to products, locations, type, size, etc., to cognitive facing program 106. Cognitive facing program 106 may make a specific request for input from the customer, via user interface 122. Cognitive facing program 106 can analyze the received patterns from the one or more customers, and, based on previous learning and the associated effectiveness score, select patterns to be implemented on the store's shelves in the future. Based on the effectiveness score and sales results, cognitive facing program 106 can award points to the customers that submitted effective facing patterns. The virtual gamification system may increase customer engagement and customer loyalty, while providing valuable feedback for the store.

Cognitive facing program 106 determines whether the effectiveness score is above a threshold (decision block 218). Cognitive facing program 106 compares the calculated effectiveness score to a pre-defined effectiveness threshold to determine whether the effectiveness score is sufficient. In an embodiment, cognitive facing program 106 performs benchmarking, for example, between different brands of the same product.

If cognitive facing program 106 determines the effectiveness score is not above a threshold ("no" branch, decision block 218), then cognitive facing program 106 creates a new facing pattern (step 220). If sales of a product displayed in a facing pattern do not meet a pre-defined target over a pre-defined period of time, then cognitive facing program 106 subsequently creates a new facing pattern in an effort to improve sales of the product. Cognitive facing program 106 creates the new facing pattern based on the received feedback and on other patterns that cognitive facing program 106 had determined are effective. In one embodiment, cognitive facing program 106 may create a new pattern that is not based on effectiveness. For example, cognitive facing program 106 may determine a pattern that features a certain color to associate the pattern with a holiday, such as red for Valentine's Day or green for St. Patrick's Day. In one embodiment, cognitive facing program 106 chooses a new facing pattern based on a plurality of facing patterns stored in database 108. Responsive to creating a new facing pattern, cognitive facing program 106 returns to step 202. Upon returning to step 210, cognitive facing program 106 generates and transmits an additional set of instructions to be executed by robot 114.

If cognitive facing program 106 determines the instructions are not executed ("no" branch, decision block 212), then cognitive facing program 106 determines whether the robot needs assistance (decision block 222). Cognitive facing program 106 analyzes images from camera(s) 110 and robot camera(s) 116 to determine whether robot 114 needs assistance to complete the task. A robot may need assistance if the robot cannot complete the assigned task in a pre-defined period of time. A robot may also need assistance if the robot is losing battery charge, has been damaged in some way, or has fallen due to a collision or slippage while moving on the floor. A robot may also need assistance if the robot has not completed a previously assigned task.

If cognitive facing program 106 determines the robot does not need assistance ("no" branch, decision block 222), then cognitive facing program 106 returns to decision block 212.

If cognitive facing program 106 determines the robot does need assistance ("yes" branch, decision block 222), then cognitive facing program 106 assigns an additional robot (step 224). In an embodiment with more than one robot, cognitive facing program 106 can assign an additional robot to help robot 114 with the assigned task. In an embodiment where robot 114 is a cognitive robot, robot 114 can request assistance directly from another robot. Also in the embodiment, robot 114 can schedule other robots to perform tasks or to help another robot that needs assistance. In addition, robot 114 can assist another robot once robot 114 has completed the assigned task.

If cognitive facing program 106 determines the effectiveness score is above a threshold ("yes" branch, decision block 218), then cognitive facing program 106 ends.

Figure 3:
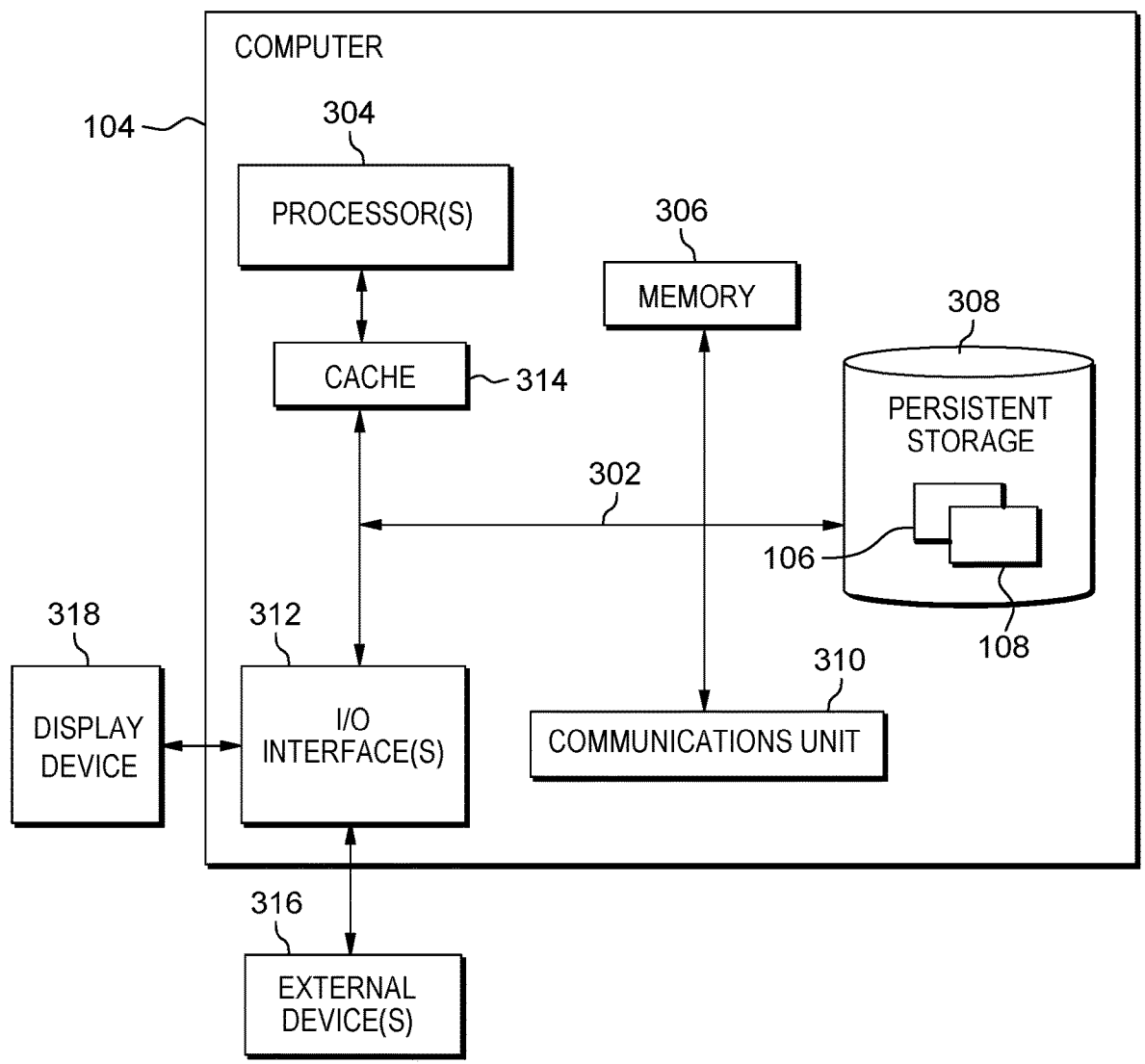
FIG. 3 depicts a block diagram of components of the server computer executing the cognitive facing program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312, and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., cognitive facing program 106 and database 108, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of camera(s) 110, sensor(s) 112, robot 114, and customer device 120. In these examples, communications unit 310 includes one or more network interface cards. Communications unit 310 may provide communications through the use of either or both physical and wireless communications links. Cognitive facing program 106, database 108, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., cognitive facing program 106 and database 108 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for cognitive retail facing, the method comprising:
   receiving, by one or more computer processors, data associated with a shelf facing of one or more products on display;
   based, at least in part, on the received shelf facing data, determining, by the one or more computer processors, whether the shelf facing matches a predetermined facing pattern, wherein the predetermined facing pattern features a certain color;
   responsive to determining the shelf facing does not match a predetermined facing pattern, generating, by the one or more computer processors, one or more instructions to adjust the one or more products to match the predetermined facing pattern;
   transmitting, by the one or more computer processors, the generated one or more instructions to one or more autonomous robots;
   requesting, by the one or more computer processors, input from one or more customers, for one or more facing patterns;
   receiving, by the one or more computer processors, one or more facing patterns from the one or more customers;
   analyzing, by the one or more computer processors, the received one or more facing patterns;
   determining, by the one or more computer processors, an effectiveness score associated with the received one or more facing patterns;
   based, at least in part, on the determined effectiveness score associated with the received one or more facing patterns, selecting, by the one or more computer processors, a first facing pattern from the received one or more facing patterns;
   transmitting, by the one or more computer processors, a first instruction to implement the first facing pattern to the one or more autonomous robots; and
   awarding, by the one or more computer processors, one or more points to a customer associated with the first facing pattern.

2. The method of claim 1, wherein the data associated with the shelf facing of one or more products on display is selected from the group consisting of at least one image and data from at least one sensor.

3. The method of claim 1, further comprising, generating, by the one or more computer processors, an effectiveness score for the predetermined facing pattern based on sales data of the one or more products on display.

4. The method of claim 3, wherein generating the effectiveness score further comprises receiving, by the one or more computer processors, a feedback, wherein the feedback is selected from the group consisting of: a customer survey, a head movement in response to a question, an image, an inventory status, a recording of a conversation, a sales data, and a sensor data.

5. The method of claim 3, further comprising:
   determining, by the one or more computer processors, whether the effectiveness score is above a threshold; and
   responsive to determining the effectiveness score is not above the threshold, creating, by the one or more computer processors, a new shelf facing pattern.

6. The method of claim 5, wherein determining whether the effectiveness score is above the threshold further comprises determining, by the one or more computer processors, whether sales of a product displayed in a facing pattern do not meet a pre-defined target over a pre-defined period of time.

7. The method of claim 3, wherein the sales data is selected from the group consisting of: received feedback, a detected pattern of sales of the one or more products in a particular facing pattern, a detected pattern of sales of the one or more products in a particular color combination, a detected pattern of sales of the one or more products in a specific shape format, sales data over a period of time, a comparison of sales of the one or more products from one time period to another time period, a product visibility, a minimum threshold of the one or more products displayed and sold, a space utilization, a readability of product labels, a way items are organized on a shelf, whether one or more customers pick up a product from the shelf, a time spent by each customer at the shelf, a facial expression of a customer at the shelf.

8. The method of claim 1, further comprising, creating, by the one or more computer processors, a subsequent facing pattern of the one or more products based on data indicating the subsequent facing pattern will increase sales.

9. The method of claim 8, further comprising:
   generating additional instructions to adjust the one or more products to match the subsequent facing pattern; and
   transmitting, by the one or more computer processors, the generated additional instructions to the one or more autonomous robots.

10. The method of claim 1, further comprising:
    determining, by the one or more computer processors, a status of the one or more autonomous robots; and based, at least in part, on the status of the one or more robots, selecting, by the one or more computer processors, a first robot from the one or more autonomous robots.

11. The method of claim 1, further comprising:

determining, by the one or more computer processors, whether the one or more instructions are executed;

responsive to determining the one or more instructions are not executed, determining, by the one or more computer processors, whether the one or more autonomous robots need assistance; and responsive to determining the one or more autonomous robots need assistance, assigning, by the one or more computer processors, at least one additional autonomous robot to execute the one or more instructions.

12. A computer program product for cognitive retail facing, the computer program product comprising:

one or more computer readable storage devices and program instructions stored on the one or more computer readable storage devices, the stored program instructions comprising:

program instructions to receive data associated with a shelf facing of one or more products on display;

based, at least in part, on the received shelf facing data, program instructions to determine whether the shelf facing matches a predetermined facing pattern, wherein the predetermined facing pattern features a certain color;

responsive to determining the shelf facing does not match a predetermined facing pattern, program instructions to generate one or more instructions to adjust the one or more products to match the predetermined facing pattern;

program instructions to transmit the generated one or more instructions to one or more autonomous robots;

program instructions to request input from one or more customers, for one or more facing patterns;

program instructions to receive one or more facing patterns from the one or more customers;

program instructions to analyze the received one or more facing patterns;

program instructions to determine an effectiveness score associated with the received one or more facing patterns;

based, at least in part, on the determined effectiveness score associated with the received one or more facing patterns, program instructions to select a first facing pattern from the received one or more facing patterns;

program instructions to transmit a first instruction to implement the first facing pattern to the one or more autonomous robots; and program instructions to award one or more points to a customer associated with the first facing pattern.

13. The computer program product of claim 12, the stored program instructions further comprising, program instructions to generate an effectiveness score for the predetermined facing pattern based on sales data of the one or more products on display.

14. The computer program product of claim 12, the stored program instructions further comprising, program instructions to create a subsequent facing pattern of the one or more products based on data indicating the subsequent pattern will increase sales.

15. A computer system for cognitive retail facing, the computer system comprising:

one or more computer processors;

one or more computer readable storage devices;

program instructions stored on the one or more computer readable storage devices for execution by at least one of the one or more computer processors, the stored program instructions comprising:

program instructions to receive data associated with a shelf facing of one or more products on display;

based, at least in part, on the received shelf facing data, program instructions to determine whether the shelf facing matches a predetermined facing pattern, wherein the predetermined facing pattern features a certain color;

responsive to determining the shelf facing does not match a predetermined facing pattern, program instructions to generate one or more instructions to adjust the one or more products to match the predetermined facing pattern;

program instructions to transmit the generated one or more instructions to one or more autonomous robots;

program instructions to request input from one or more customers, for one or more facing patterns;

program instructions to receive one or more facing patterns from the one or more customers;

program instructions to analyze the received one or more facing patterns;

program instructions to determine an effectiveness score associated with the received one or more facing patterns;

based, at least in part, on the determined effectiveness score associated with the received one or more facing patterns, program instructions to select a first facing pattern from the received one or more facing patterns;

program instructions to transmit a first instruction to implement the first facing pattern to the one or more autonomous robots; and program instructions to award one or more points to a customer associated with the first facing pattern.

16. The computer system of claim 15, the stored program instructions further comprising, program instructions to generate an effectiveness score for the predetermined facing pattern based on sales data of the one or more products on display.

17. The computer system of claim 15, the stored program instructions further comprising, program instructions to create a subsequent facing pattern of the one or more products based on data indicating the subsequent pattern will increase sales.

* * * * *